Patented Apr. 3, 1934

1,953,494

UNITED STATES PATENT OFFICE 1,953,494

PROCESS OF PREPARING SUBSTITUTED GUANIDINES

Helmuth Meis, Leverkusen-on-the-Rhine, Germany, assignor to I. G. Farbenindustrie Aktiengesellschaft, Frankfort-on-the-Main, Germany, a corporation of Germany No Drawing. Application August 22, 1927, Serial No. 214,784. In Germany August 26, 1926

3 Claims. (Cl. 260—125)

The present invention relates to improvements in the manufacture of trisubstituted guanidines and to new compounds obtainable thereby, more particularly to a process of preparing guanidines of the general formula:

wherein $R_1$ represents an aromatic hydrocarbon radicle and R a hydrocarbon radicle of the group comprising alkyl, aryl, and aralkyl. The process for their production consists in treating a substituted thio-urea of the general formula:—

wherein $R_1$ represents an aromatic hydrocarbon radical with an organic or inorganic desulfurizing zinc compound capable of yielding zinc sulfide with hydrogen sulfide, and a primary organic base, for example, aniline, benzylamine, methylamine, in the presence of a compound of the group comprising the oxides and hydroxides of the alkalies and alkaline earth metals.

The process may be illustrated by the following example:—

*Example.*—In a vessel provided with a stirrer 130 kilograms of crystallized sulfate of zinc are dissolved in 800 litres of water and 100 kilograms of thiocarbanilide and 300 kilograms of aniline are added. Then 265 kilograms of a 30 per cent caustic soda lye are slowly added and the resulting mixture is slowly heated to 70–80° C. during about 20 hours. The excess of aniline is removed with steam and the mixture of triphenylguanidine with zinc sulfide is filtered off. The triphenylguanidine thus obtained is extracted with hot alcohol, benzene, toluene or xylene.

In an analogous manner other trisubstituted guanidines can be produced e. g. from the thiocarbanilide and benzylamine the hitherto unknown diphenyl benzylguanidine having the formula:—

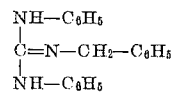

It crystallizes in the shape of white crystals melting at 102–103° C. From thiocarbanilide and methylamine the new diphenylmethylguanidine which crystallizes from alcohol in well formed crystals melting at 108–109° C.

I claim:—

1. The process which comprises treating a substituted thiourea of the general formula:

wherein $R_1$ stands for an aromatic hydrocarbon radicle, with a desulfurizing zinc compound and a primary organic amine in the presence of a compound of the group consisting of the oxides and hydroxides of the alkalies and alkaline earth metals.

2. The process which comprises treating thiocarbanilide with a desulfurizing zinc compound and a primary organic amine in the presence of a compound of the group consisting of the oxides and hydroxides of the alkalies and alkaline earth metals.

3. The process which comprises treating thiocarbanilide with zinc sulfate and benzyl-amine in the presence of caustic soda lye.

HELMUTH MEIS.